United States Patent [19]

Greenspan et al.

[11] Patent Number: 5,109,408
[45] Date of Patent: Apr. 28, 1992

[54] ARRANGEMENT FOR INTENTIONALLY BLOCKING TELEPHONE CALLS TO PREDEFINED DESTINATION NUMBERS BUT ALLOWING SUCH BLOCKING TO BE SELECTIVELY OVERRIDDEN

[75] Inventors: Steven L. Greenspan, Oak Park; Joel M. Marks, Naperville; Timothy J. Scale, Downers Grove, all of Ill.

[73] Assignee: AT&T Bell Laboratories, Murray Hill, N.J.

[21] Appl. No.: 444,075

[22] Filed: Nov. 30, 1989

[51] Int. Cl.⁵ .............................. H04M 3/00
[52] U.S. Cl. ...................... 379/197; 379/188
[58] Field of Search ........... 379/188, 196, 197, 198, 379/200, 243, 201

[56] References Cited

U.S. PATENT DOCUMENTS

| | | |
|---|---|---|
| 3,786,196 | 1/1974 | Gresham .................... 379/198 X |
| 4,064,372 | 12/1977 | Altenburger ................ 379/196 X |
| 4,162,377 | 7/1979 | Mearns . | |
| 4,232,199 | 11/1980 | Boatwright et al. ............ 379/197 |
| 4,277,649 | 7/1981 | Sheinbein . | |
| 4,346,264 | 8/1982 | Sharvit ....................... 379/198 |
| 4,348,554 | 9/1982 | Asmuth . | |

FOREIGN PATENT DOCUMENTS 0001155  6/1986  Japan .................................. 379/196

OTHER PUBLICATIONS

MCI Execunet Bulletin, Dec. 24, 1975.

Primary Examiner—James L. Dwyer
Assistant Examiner—Ahmad F. Matar
Attorney, Agent, or Firm—R. T. Watland

[57] ABSTRACT

A call processing embodiment where customers are offered, in addition to the conventional office dialing plan, a special dialing plan where received numbers are processed such that a query of a database is defined when a prespecified access code, e.g., *66, is received, for example followed by a destination number, but where call blocking is defined for a predefined plurality of destination numbers, e.g., all destination numbers beginning with 976 or 1-900 or all destination numbers beginning with 1, when such numbers are received without the prespecified access code. Illustratively, the database query may result in the customer being prompted for a personal identification number (PIN) and accordingly 976 or 1-900 access is thereby limited to those knowing the PIN. The database may perform other call screening and call management operations such as time of day or day of week screening or limiting the number or cost of 976 calls in a given time period.

14 Claims, 8 Drawing Sheets

MEMORY 110

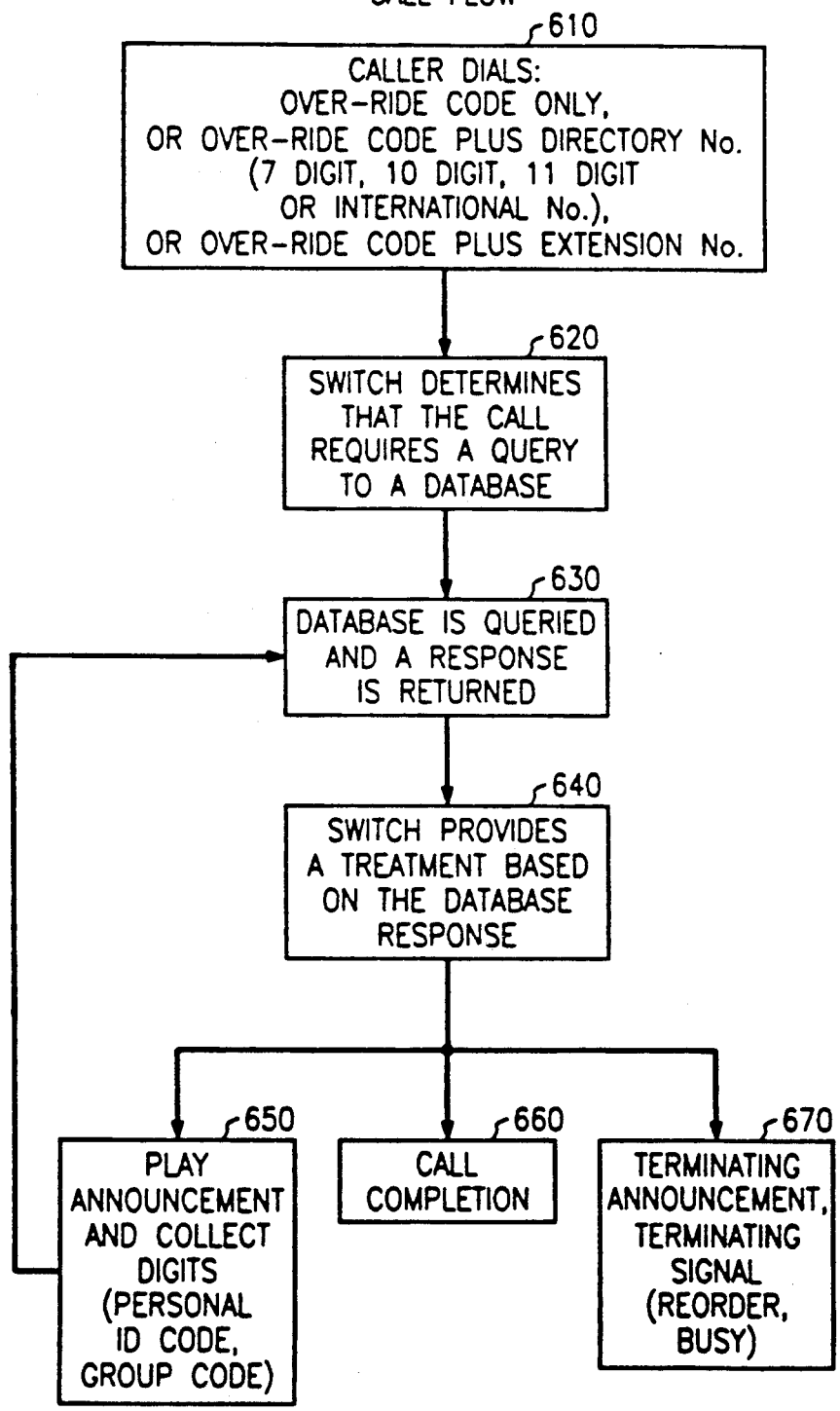

DIALING PLAN 1 TABLES

210

| TABLE 1 | | |
|---|---|---|
| CUST DIALS | NEXT TABLE | RESULT |
| 0 | 1 | OPERATOR |
| 1 | 2 | CONTINUE |
| 2 | 3 | CONTINUE |
| 3 | 3 | CONTINUE |
| 4 | 3 | CONTINUE |
| 5 | 3 | CONTINUE |
| 6 | 3 | CONTINUE |
| 7 | 3 | CONTINUE |
| 8 | 3 | CONTINUE |
| 9 | 4 | CONTINUE |
| * | 5 | CONTINUE |
| # | 1 | BLOCK |

| TABLE 4 | | |
|---|---|---|
| CUST DIALS | NEXT TABLE | RESULT |
| 0 | 4 | BLOCK |
| 1 | 4 | BLOCK |
| 2 | 7 | CONTINUE |
| 3 | 7 | CONTINUE |
| 4 | 7 | CONTINUE |
| 5 | 7 | CONTINUE |
| 6 | 7 | CONTINUE |
| 7 | 6 | CONTINUE |
| 8 | 7 | CONTINUE |
| 9 | 7 | CONTINUE |
| * | 4 | BLOCK |
| # | 4 | BLOCK |

| TABLE 6 | | |
|---|---|---|
| CUST DIALS | NEXT TABLE | RESULT |
| 0 | 6 | BLOCK |
| 1 | 6 | BLOCK |
| 2 | 10 | CONTINUE |
| 3 | 10 | CONTINUE |
| 4 | 10 | CONTINUE |
| 5 | 10 | CONTINUE |
| 6 | 6 | BLOCK |
| 7 | 10 | CONTINUE |
| 8 | 10 | CONTINUE |
| 9 | 10 | CONTINUE |
| * | 6 | BLOCK |
| # | 6 | BLOCK |

| TABLE 5 | | |
|---|---|---|
| CUST DIALS | NEXT TABLE | RESULT |
| 0 | 5 | BLOCK |
| 1 | 5 | BLOCK |
| 2 | 5 | BLOCK |
| 3 | 5 | BLOCK |
| 4 | 5 | BLOCK |
| 5 | 5 | BLOCK |
| 6 | 8 | CONTINUE |
| 7 | 5 | BLOCK |
| 8 | 5 | BLOCK |
| 9 | 5 | BLOCK |
| * | 5 | BLOCK |
| # | 5 | BLOCK |

| TABLE 8 | | |
|---|---|---|
| CUST DIALS | NEXT TABLE | RESULT |
| 0 | 8 | BLOCK |
| 1 | 8 | BLOCK |
| 2 | 8 | BLOCK |
| 3 | 8 | BLOCK |
| 4 | 8 | BLOCK |
| 5 | 8 | BLOCK |
| 6 | 9 | QUERY |
| 7 | 8 | BLOCK |
| 8 | 8 | BLOCK |
| 9 | 8 | BLOCK |
| * | 8 | BLOCK |
| # | 8 | BLOCK |

| TABLE 9 | | |
|---|---|---|
| CUST DIALS | NEXT TABLE | RESULT |
| 0 | 9 | BLOCK |
| 1 | 13 | CONTINUE |
| 2 | 11 | CONTINUE |
| 3 | 9 | BLOCK |
| 4 | 14 | CONTINUE |
| 5 | 11 | CONTINUE |
| 6 | 9 | BLOCK |
| 7 | 10 | CONTINUE |
| 8 | 10 | CONTINUE |
| 9 | 12 | CONTINUE |
| * | 9 | BLOCK |
| # | 9 | BLOCK |

FIG. 7

DIALING PLAN 2 TABLES

220

| TABLE 1 | | | TABLE 5 | | | TABLE 6 | | |
|---|---|---|---|---|---|---|---|---|
| CUST DIALS | NEXT TABLE | RESULT | CUST DIALS | NEXT TABLE | RESULT | CUST DIALS | NEXT TABLE | RESULT |
| 0 | 1 | BLOCK | 0 | 5 | BLOCK | 0 | 6 | BLOCK |
| 1 | 2 | CONTINUE | 1 | 5 | BLOCK | 1 | 6 | BLOCK |
| 2 | 3 | CONTINUE | 2 | 7 | CONTINUE | 2 | 8 | CONTINUE |
| 3 | 3 | CONTINUE | 3 | 7 | CONTINUE | 3 | 8 | CONTINUE |
| 4 | 3 | CONTINUE | 4 | 7 | CONTINUE | 4 | 8 | CONTINUE |
| 5 | 3 | CONTINUE | 5 | 7 | CONTINUE | 5 | 8 | CONTINUE |
| 6 | 3 | CONTINUE | 6 | 7 | CONTINUE | 6 | 6 | CONTINUE |
| 7 | 3 | CONTINUE | 7 | 6 | CONTINUE | 7 | 8 | CONTINUE |
| 8 | 3 | CONTINUE | 8 | 7 | CONTINUE | 8 | 8 | CONTINUE |
| 9 | 5 | CONTINUE | 9 | 7 | CONTINUE | 9 | 8 | CONTINUE |
| * | 1 | BLOCK | * | 5 | BLOCK | * | 6 | BLOCK |
| # | 1 | BLOCK | # | 5 | BLOCK | # | 6 | BLOCK |

FIG. 8

ARRANGEMENT FOR INTENTIONALLY BLOCKING TELEPHONE CALLS TO PREDEFINED DESTINATION NUMBERS BUT ALLOWING SUCH BLOCKING TO BE SELECTIVELY OVERRIDDEN

TECHNICAL FIELD

This invention relates to telecommunications.

BACKGROUND AND PROBLEM

Local telephone companies have increasingly come under fire concerning their audiotex, or dial-it, services, e.g., 976 services. Consumers complain that children have too easily gained access to dial-a-porn messages. In fact, lawsuits have been filed against telephone companies related to assaults by children having extensive dial-a-porn access. There is a similar controversy over extraordinarily high telephone bills run up by some customers on live, interactive services, often called gab lines. Even calls to prerecorded messages can be expensive. The courts have stymied attempts to stop carrying dial-a-porn based on First Amendment protection. The perception left with many is that the phone company is, however grudgingly, making a lot of money off the sale of obscenity over the phone lines.

Most telephone companies do make money off 976 services, and those revenues help keep local telephone rates down. The issues raised by 976 services are likely to come up again and again as telephone companies seek to boost network usage, and thus their revenues, by introducing new services using local network technologies.

Telephone companies and regulators in many states are dealing with the problems raised by dial-a-porn and other 976 services by offering blocking services, often for charges at or below cost. Blocking allows a customer to prohibit access to any 976 or other dial-it service number for a particular phone line. This solution is, however, not totally satisfactory to 976 service providers, telephone companies or customers, because is prohibits access to all 976 services, including those that are not controversial such as time and weather services. Some companies have split their existing 976 services into two categories, moving those services that offer live conversations and adult-oriented messages onto a new three-digit prefix such as 960. However, this wastes a valuable prefix and raises definitional problems.

Two general categories of call screening services are available. The first is the call block service, where calls to a set of Numbering Plan Areas (NPAs) or office codes are not allowed, and is generally accomplished within the local switching system. The second category of service includes call screening services where a call may or may not be completed depending on the response to a query that goes to a database, where the database may be internal or external to the switching system. The switch queries the database based on the fact that a customer has dialed a specific NPA or office code or abbreviated directory number. The database may require the customer to provide a personal identification number (PIN) or authorization code prior to concluding the screening function. The first category of service is generally available to most telephone service subscribers; however the second category is not as generally available because it requires more switch capabilities than the first. The fact that a customer subscribes to a call blocking service for a specific set of NPAs or office codes prevents them from using the other call screening services of the second category based on the same set of NPAs or office codes. In addition, the known call blocking services do not provide selective blocking such that a customer can limit, for example, 976 access by their children, without blocking all access to 976 services from their line.

SOLUTION

These problems are solved and a technical advance is achieved in accordance with the principles of the invention in an exemplary call processing embodiment where call blocking is selectively overridden by dialing a prespecified prefix or access code, e.g., *66. Customers are offered, in addition to the conventional office dialing plan, a special dialing plan where received numbers are processed such that a query of a database is defined when the prespecified access code is received, for example followed by a destination number, but where call blocking is defined for a predefined plurality of destination numbers, e.g., all destination numbers beginning with 976 or 1-900 or all destination numbers beginning with 1, when such numbers are received without the prespecified access code. Illustratively, the database query may result in the customer being prompted for a personal identification number (PIN) and accordingly 976 or 1-900 access is thereby limited to those knowing the PIN. The database may perform other call screening and call management operations such as time of day or day of week screening or limiting the number or cost of 976 calls in a given time period.

A call processing method in accordance with the invention is used in an arrangement comprising a database and switching means connectable to a plurality of customer stations. The switching means includes memory that stores data defining a plurality of dialing plans and defining for each of the customer stations the one of the plans to be used for calls from that customer station. A first dialing plan defines processing of received numbers such that a query of the database is defined when a prespecified access code is received and such that call blocking is defined when one of a predefined plurality of destination numbers is received without the prespecified access code. A second dialing plan defines processing of received numbers such that continued call processing is defined when one of the predefined destination numbers is received. Information is received for an outgoing call from one of the customer stations. The data stored in the memory is read to determine the dialing plan to be used for calls from that station. The received information is then processed in accordance with the determined dialing plan.

When the determined dialing plan is the first dialing plan, a query is transmitted to the database to determine further processing of the call when the received information does include the prespecified access code. The call is blocked when the received information does not include the prespecified access code but does include one of the predefined destination numbers.

Illustratively, the information received from the one station including the prespecified access code further includes one of the predefined destination numbers. After the query is transmitted, a query response is received from the database and the call is processed in accordance with the query response. Such processing may include completing the call by processing the destination number in accordance with the second dialing plan, or providing terminating treatment for the call. The station may be prompted for further information such as a personal identification number (PIN). When a PIN is received from the one station, that PIN is transmitted to the database which in turn returns a further response indicating a presence or absence of entitlement to complete the call. Alternatively, the database may return an authorized PIN for the one station, and the call is completed as soon as that PIN is received from the station.

The method is useful in a number of arrangements including a database and switching means. For example, the database may be included within the switching means or may be interconnected with the switching means via a data link, e.g., a common channel signalling system 7 (CCS7) link. The switching means may include both a switching system connectable to the customer stations and a feature node for processing calls to and from the customer stations in cooperation with the switching system. Again, the database may be included within the feature node or may be interconnected with the feature node via a data link. The memory storing the dialing plan data may be in either the switching or the feature node.

DRAWING DESCRIPTION

FIG. 6 is a call flow diagram for call processing in accordance with the exemplary feature of the present invention;

FIGS. 7 and 8 are exemplary dialing plan tables stored in the memory of FIG. 2;

DETAILED DESCRIPTION

Figure 1:
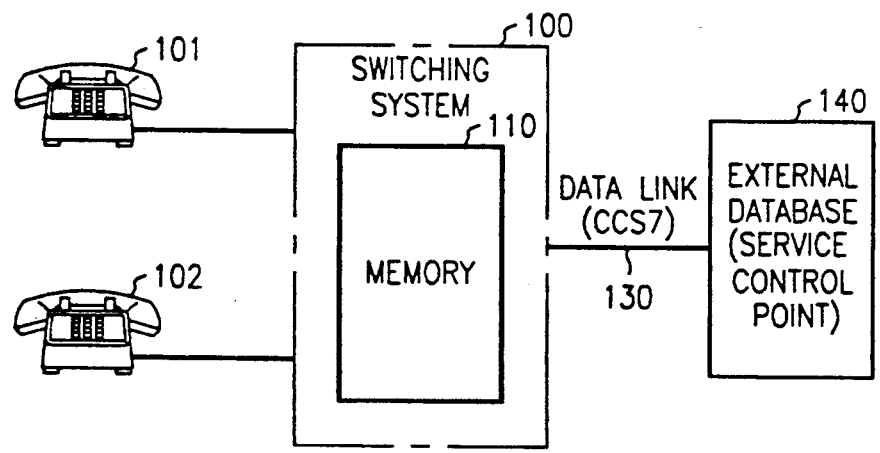
FIG. 1 is a diagram of an exemplary network configuration in which the present invention is implemented.

FIG. 1 is a diagram of an exemplary network configuration in which the present invention is implemented. A local or class 5 switching system 100 serves customer stations, e.g., 101, 102, and is interconnected via a data link 130 with an external database 140, e.g., a service control point. Data link 130 may for example implement CCS7 signaling. Switching system 100 includes memory 110 shown in greater detail in FIG. 2. Memory 110 stores per-line data 240 such as block 241 associated with customer station 101 and block 242 associated with customer station 102. Memory 110 also stores data defining at least two dialing plans, dialing plan 1 and dialing plan 2, having associated tables 210 and 220 respectively. The per-line data blocks 241 and 242 each include data defining the starting dialing plan table to be used for the customer station associated with that block. For example data block 241 may define that dialing plan 1 table 1 is the starting table to be used for calls from customer station 101 and data block 242 may define that dialing plan 2 table 1 is the starting table to be used for calls from customer station 102. A dialing plan is implemented by sequencing through dialing plan tables based on the starting table and the dialed digits as described further herein.

Figure 2:
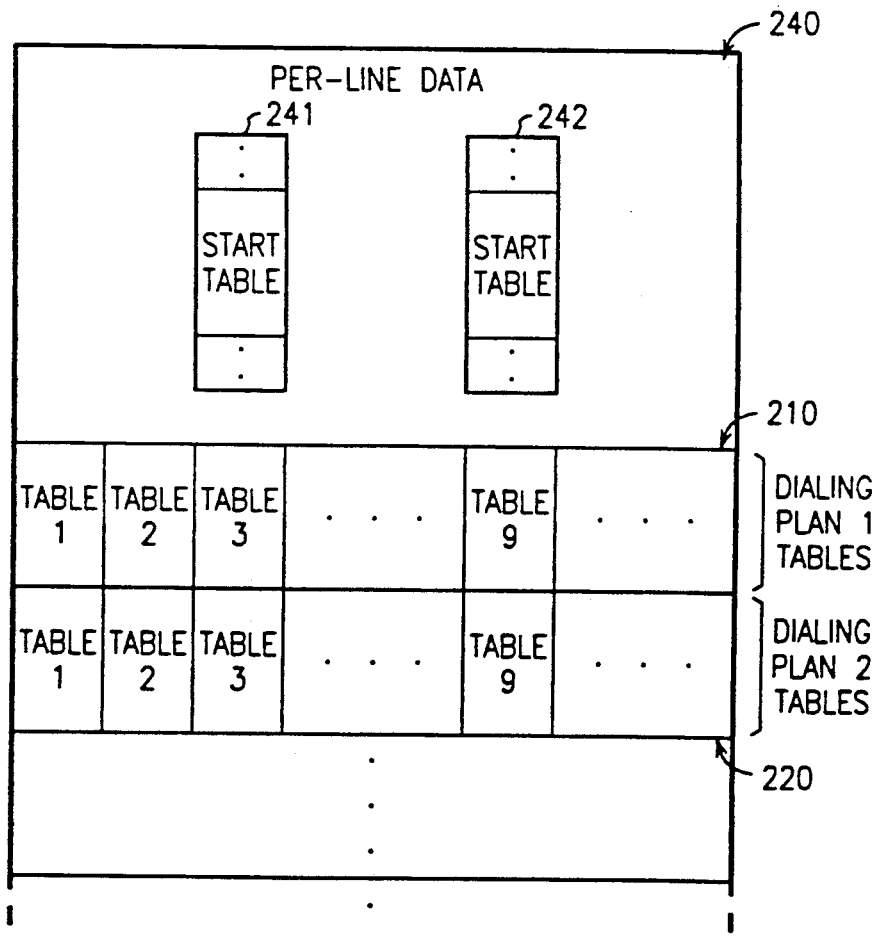
FIG. 2 is a memory map for a memory included in the configuration of FIG. 1.
Figure 3:
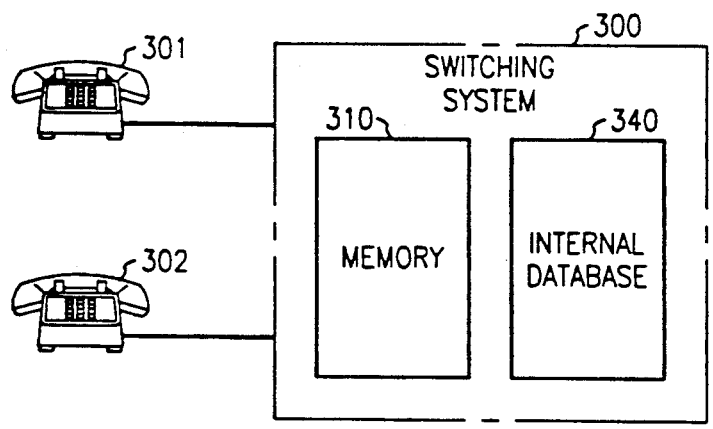
FIGS. 3-5 are network configuration alternatives to the configuration of FIG. 1.
Figure 4:
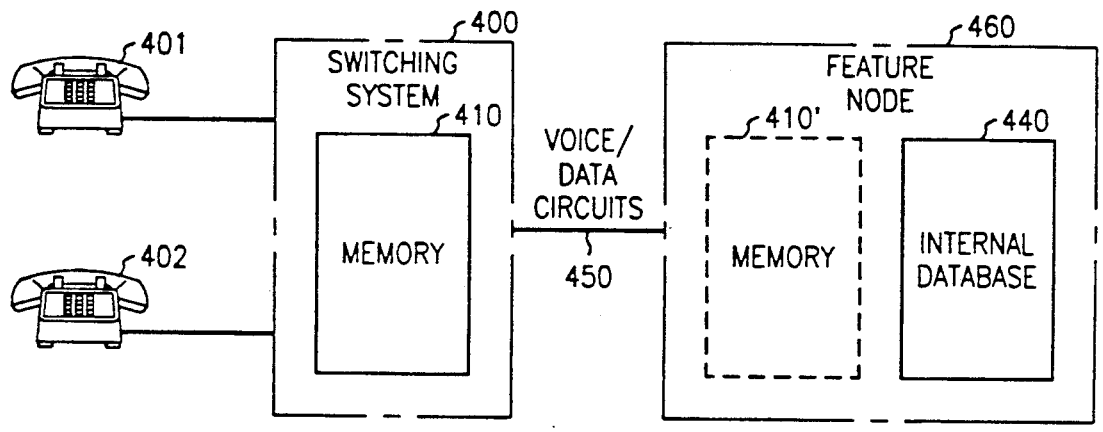
Figure 5:
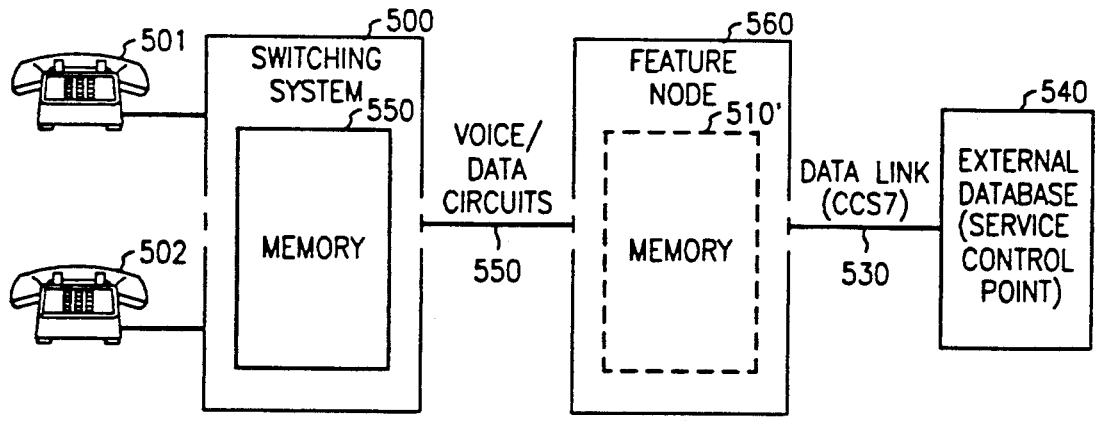

FIGS. 3, 4 and 5 are diagrams of alternative network configurations. In FIG. 3, a local switching system 300 serves customer stations, e.g., 301, 302, and includes memory 310 substantially identical to memory 110 of FIG. 2. However, in the configuration of FIG. 3, database 340 which is queried in accordance with the invention is included within local switching system 300.

In FIG. 4, a local switching system 400 serves customer stations, e.g., 401, 402 and includes memory 410 substantially identical to memory 110 of FIG. 2. However, in FIG. 4, a feature node 460 interconnected with switching system 400 via voice/data circuits 450, e.g., primary rate interface (PRI) ISDN trunks or basic rate interface (BRI) circuits, cooperates with switching system 400 to process calls to and from customer stations 401 and 402. Also in FIG. 4, the database which is queried in accordance with the invention is database 440 included within feature node 460. Alternatively, the memory including the dialing plan tables may be memory 410' included within feature node 460. As a further alternative, feature node 460 may be interconnected with switching system 400 via a trunk and a separate signaling link.

In FIG. 5, a local switching system 500 serves customer stations, e.g., 501, 502 and includes memory 510 substantially identical to memory 110 of FIG. 2. A feature node 560 interconnected with switching system 500 via voice data trunks 550, e.g., primary rate ISDN trunks, cooperates with switching system 500 to process calls to and from customer stations 501 and 502. Feature node 560 is interconnected via a data link 530 with an external database 540, e.g., a service control point. Data link 530 may for example implement CCS7 signaling. Alternatively, the memory including the dialing plan tables may be memory 510' included within feature node 560.

In FIGS. 4 and 5, the prespecified access code, e.g., *66, may be interpreted by the switching system to switch the call to the feature node, or the call could be switched to the feature node on off-hook. In either case, the call is switched to the feature node and the access code is interpreted by the feature node. As an example, the full directory number may be dialed immediately after the access code and all the dialed digits may be processed by the feature node.

The exemplary over-ride feature works as follows. The customer picks up the phone and dials an access code, and then dials a directory number. The switch launches a query to a database and a response is returned. The response can instruct the switch to do various actions such as route to an announcement, play an announcement and collect digits, or connect to a translated number or connect to the directory number that was dialed after the access code. The customer dials the access code followed by the directory number if they want to complete a call to the directory number, as the switch has been configured by its data to block all calls to directory numbers of this type for this customer. The feature essentially changes the customer's access to a service from blocking the call to screening the call.

For example, assume that the customer requests that the telephone company set the switch up so that all 976-XXXX calls from their phone are blocked. As used herein, the sequence XXXX can stand for any number from 0000-9999 inclusive. The customer also requests to have the over-ride feature of the present invention. This feature allows the customer to complete 976-XXXX calls that would normally be blocked. The access code can be any sequence of characters or symbols that can be input to the switch. In this example assume that the code is three characters and the value of the code is *66. When the customer dials *66976XXXX, the switch queries a database and the resulting response can cause the switch to complete the call, if the over-ride feature for this 976 service allows the call to be completed. As one example, assume that unless there is a resource problem in the switch, the call is completed to the 976-XXXX number that was dialed after the *66 code. It is possible to have a complex screening service for the type of call that is normally blocked, occur when the access code is used. An example of a more complex screening service is described herein with respect to FIG. 11.

A call flow diagram for the over-ride feature is shown in FIG. 6. The caller dials (block 610) the access code plus a directory number or extension number, for example *66976XXXX. From this information the switch determines (620) that a query to a database is required and sends (block 630) a query to the database. The switch then receives (block 640) a database response and provides treatment to the caller based on the response from the database. FIG. 6 shows several of the possible switch responses. The switch can play (block 650) an annoucement and collect more digits, or collect a personal identification code, or a group code from the caller. The switch then would send another message to the database and get another response back. This continues until the response requires terminating treatment. Another response is that the switch plays (block 670) a terminating announcement or sends a signaling tone or an error tone to the caller. Another treatment is to provide the caller with call completion (660) so that the caller is connected to the port associated with either the number that was dialed after the access code *66 or a translation of that number. It is also important to note that on a dial pluse line the subscriber could use 11 as the access code rather than a code using * or #.

The descriptions and diagrams of FIGS. 7-10 are for an example implementation used for the over-ride feature. It is important to understand what can be dialed normally by the customer and what can be allowed by using the over-ride feature. The customer's dialed digits are normally processed by the switch by having the switch read a set of digit interpretation tables to determine whether the dialed number is a valid number for this customer and, if the number is valid, where to route the call. These tables are normally lumped into what is referred to as an office dialing plan. Some subscribers can subscribe to what is called an individualized dialing plan that provides extra capabilities to the customer for activation/deactivation of switch based services and access to call management and call screening services by having the switch query a database.

The over-ride feature requires the switch to have the capability to provide at least two office dialing plans. Calls that are normally blocked are tagged in dialing plan 1 as requiring blocking treatment; this usually means giving the customer an error tone or an error announcement. Dialing plan 1 also has entries for the access code(s). An example of the dialing plan 1 tables 210 is shown in FIG. 7. The analysis of digits begins with table 1 of dialing plan 1. The dialing plan 1 access code entries also specify that the switch must query a database for further information, and may have entries as to how many more digits the customer can dial after the access code has been dialed. Note by examining tables 1, 4 and 6, that customers may dial 972, 973, 974, 975, 977, 978, and 979 office codes but not the digit sequences 970, 971, 976, 97*, or 97#. Also note by examining tables 1, 5, 8 and 9, that customers may dial *66 followed by whatever is allowed in table 9. This could be seven or ten digit numbers depending on the tables pointed to by the next fields in table 9. Table 9 shows that a number starting with *66 followed by a 9 is allowed. Subsequent tables (not shown) would define that *66976-XXXX would be allowed. The switch always uses dialing plan 1 for the customers who have subscribed to the over-ride feature to process the customer's originally dialed number. If the access code has been dialed, the switch launches a query to the database after the customer has dialed a valid number (according to an entry (not shown) in the dialing plan for number of digits). When the response comes back the switch can perform several types of actions. If the call is to be blocked, an error tone or announcement is given to the customer. If the call is to be queued for a resource, the customer can be given an announcement or a special tone. If a PIN or other type of identification code is required, the switch can play an announcement, collect subsequent digits, and then launch another query to the database for more information and instructions. If the call is to be routed to a specific directory number or route, the number or route can be processed in accordance with dialing plan 2 to determine whether the call is allowed. The nature of the over-ride feature is that dialing plan 2 allows the types of calls that are blocked by dialing plan 1. Dialing plan 2 could be constructed to allow any number that can be completed from the office to any other office, or the same office. An example of the dialing plan 2 tables 220 is shown in FIG. 8. Note by examining tables 1, 5 and 6 that customers may dial 972, 973, 974, 975, 976, 977, 978, and 979 office codes, but, for example, not the digit sequences *, #, 0, 970, 971, 97* or 97#. The switch may provide additional dialing plans. For example, a third dialing plan may be used to provide a simple call blocking service to customers that don't subscribe to the blocking over-ride feature.

Figure 9:
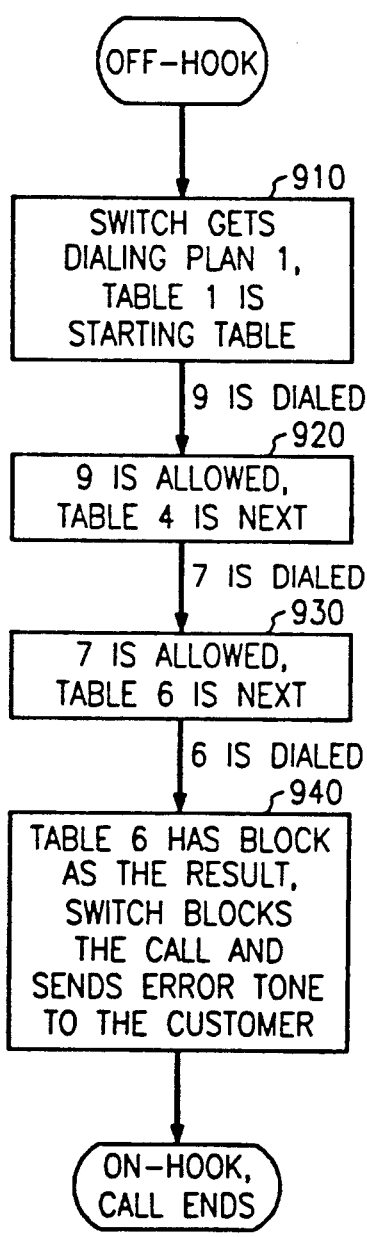
FIGS. 9 and 10 are sequence diagrams illustrating operation of the exemplary feature of the present invention for particular calls.
Figure 10:
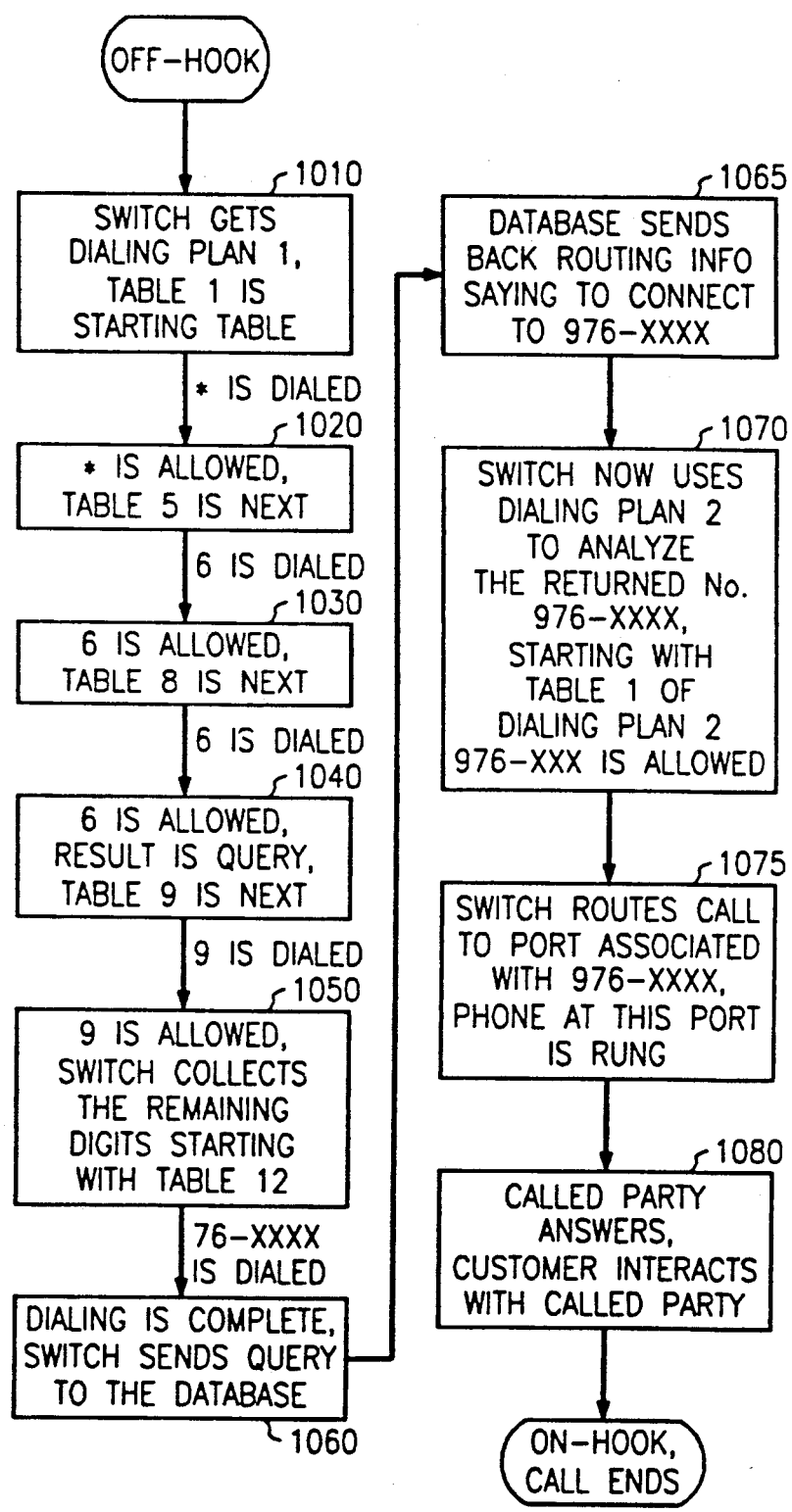

FIGS. 9 and 10 are sequence diagrams illustrating the use of dialing plans 1 and 2 allowing a customer to use the over-ride feature to provide a call treatment that is different from that of the blocked call. FIG. 9 illustrates the case where the customer dials 976-XXXX and the switch provides call blocking. Dialing plan 1 has its tables populated such that if a customer dials 976 that call is flagged as requiring block treatment. The same customer subscribing to the over-ride feature as well as 976 call blocking completes a call to the 976 number that was previously blocked by dialing the access code, in this example *66. FIG. 10 shows the detailed call flow for this case. In this particular example, the switch is programmed to use the two dialing plans 1 and 2 as shown in FIG. 10. The original input from the customer is applied to dialing plan 1 for interpretation and the routing number that is returned from the database query is applied to dialing plan 2. The number that is applied is the directory number without the access code. If this number, in the example 976-XXXX, were to be applied to the dialing plan 1 the call would always be blocked. If the number is applied to office dialing plan 2, the switch always attempts to complete the call.

As an alternative when caller verification is effected using a PIN, the database may include, in its response to the initial query, an authorized PIN associated with the calling station. As soon as the customer station transmits that authorized PIN, the call may be completed without further communication with the database.

Figure 11:
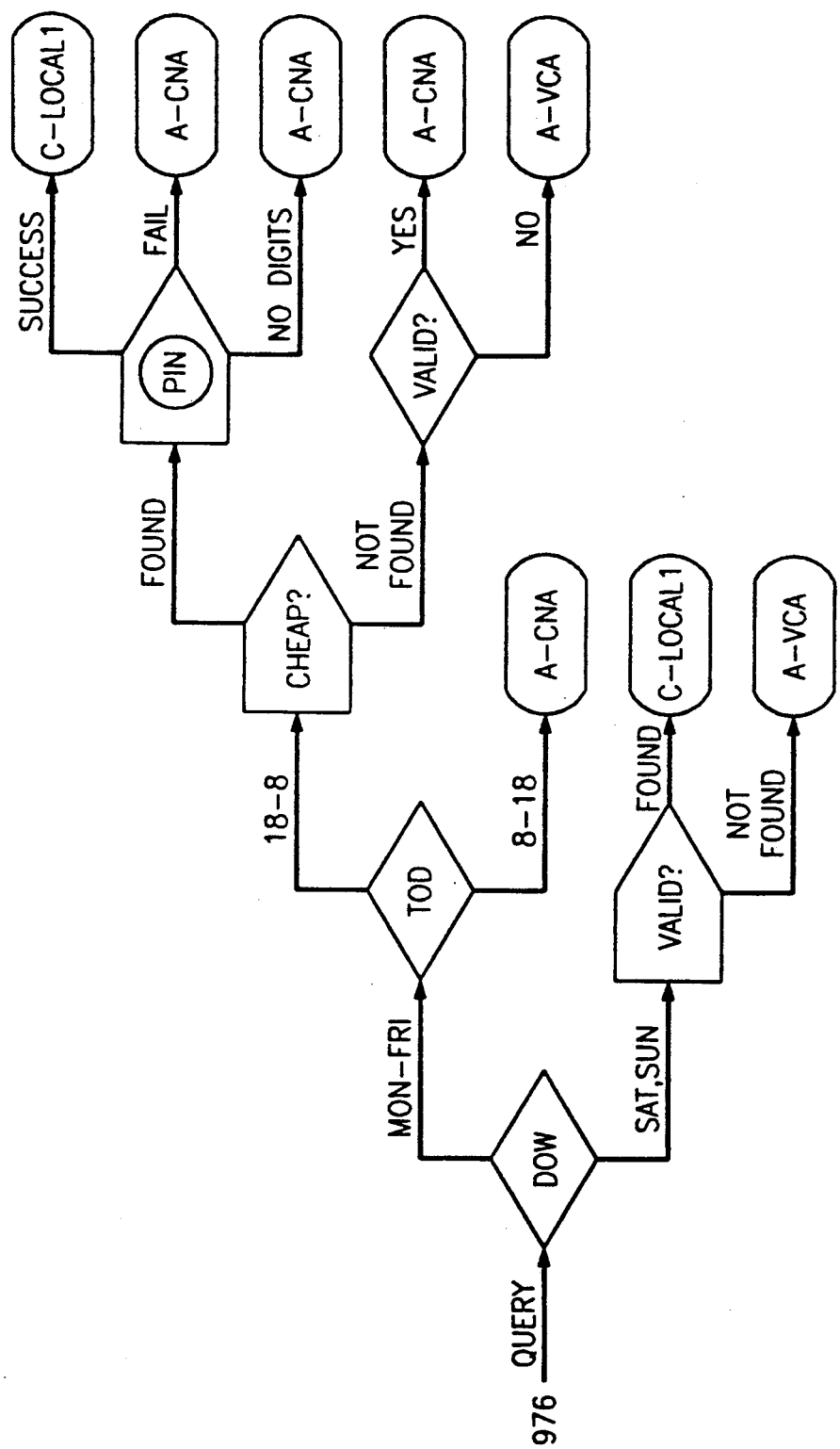
FIG. 11 is a decision graph for an exemplary call screening service.

FIG. 11 is a decision graph for an example of a more complex screening service performed by the database for the type of call that is normally blocked. The service first checks the day of week and then branches on that decision to follow either of two paths—one path during the week and the other path for the weekend. The nodes are executed from left to right until a terminating node is reached. The terminating nodes A-CNA tell the switch to play a "Call not allowed" announcement, A-VCA nodes tell the switch to play a "Vacant code announcement", and C-local 1 nodes tell the switch to connect the call either to the original dialed 976 number or a translation of that number. In FIG. 11, the decision nodes have either four or five sides. Five-sided nodes represent a logical decision involving a search of a data table, for example to determine whether a particular dialed 976 number is valid. Four-sided nodes represent a logical decision not involving a data table search. The five-sided node PIN includes a circle indicating that a collection of input from a customer—in this case a PIN—is required as the basis of a data table search. In this example, the 976 numbers are categorized as cheap or expensive.

It is to be understood that the above-described embodiments are merely illustrative of the principles of the invention and that many variations may be devised by those skilled in the art without departing from the spirit and scope of the invention. It is therefore intended that such variations be included within the scope of the claims.

We claim:

1. A call processing method for use in an arrangement comprising database means and switching means, said switching means connectable to a plurality of customer stations, said switching means including memory means, said method comprising storing data in said memory means defining a plurality of dialing plans and defining for each of said customer stations the one of said plans to be used for calls from that customer station, said plans including a first plan defining processing of received numbers such that a query of said database means is defined when a prespecified access code is received and such that call blocking is defined when one of a predefined plurality of destination numbers is received without said prespecified access code, said plurality of plans further including a second plan defining processing received numbers such that continued call processing is defined when one of said predefined destination numbers is received, receiving information for an outgoing call from one of said customer stations, reading said stored data in said memory means to determine the one of said plans to be used for calls from said one station, and processing said received information in accordance with the determined dialing plan, wherein when said determined dialing plan is said first dialing plan, transmitting a query to said database means to determine further processing of said call when said received information does include said prespecified access code and one of said predefined destination numbers, and blocking said call when said received information does not include said prespecified access code but does include one of said predefined destination numbers, and after transmitting said query, receiving a query response from said database means, and processing said call in accordance with said query response.

2. A method in accordance with claim 1 wherein said query response defines call completion, and said processing said call in accordance with said query response comprises completing said call to said further included destination number.

3. A method in accordance with claim 2 wherein said completing comprises processing said further included destination number in accordance with said second dialing plan.

4. A method in accordance with claim 1 wherein said query response defines call termination, and said processing said call in accordance with said query response comprises providing terminating treatment for said call.

5. A call processing method for use in an arrangement comprising database means and switching means connectable to a plurality of customer stations, said switching means including memory means, said method comprising storing data in said memory means defining a plurality of dialing plans and defining for each of said customer stations the one of said plans to be used for calls from that customer station, said plans including a first plan defining processing of received numbers such that a query of said means is defined when a prespecified access code is received and such that call blocking is defined when one of a predefined plurality of destination numbers is received without said prespecified access code, said plurality of plans further including a second plan defining processing of received numbers such that continued call processing is defined when one of said predefined destination numbers is received, receiving information for an outgoing call from one of said customer stations, reading said stored data in said memory means to determine the one of said plans to be used for calls from said one station, and processing said received information in accordance with the determined dialing plan, wherein when said determined dialing plan is said first dialing plan, transmitting a query to said database means to determine further processing of said call when said received information includes said prespecified access code, receiving a query response from said database means, said query response defines caller verification, processing said call in accordance with said query response, said processing comprising transmitting further information received from said one station to said database means, receiving a further response from said database means, and processing said call in accordance with said further response; and blocking said call when said received information does not include said prespecified access code but does include one of said predefined destination numbers.

6. A method in accordance with claim 5 wherein said received further information comprises a personal identification number.

7. A method in accordance with claim 5 wherein said processing said call in accordance with said query response further comprises
prompting said one station for said further information.

8. A method in accordance with claim 1 wherein said query includes an identification of said one station.

9. A method in accordance with claim 8 further comprising
said database means determining an authorized personal identification number for said identified one station,
wherein said query response includes said authorized personal identification number, and said method further comprising
upon receiving further information from said one station including said authorized personal identification number, completing said call to said further included predefined destination number.

10. A method in accordance with claim 1 further comprising
said database means performing a call screening operation in response to receipt of said query, and
said database means transmitting said query response based on a result of said call screening operation.

11. A call processing method for use in an arrangement comprising database means, a switching system connectable to a plurality of customer stations and a feature node for processing calls to and from said customer stations in cooperation with said switching system, said feature node including memory means, said method comprising
storing data in said memory means defining a plurality of dialing plans and defining for each of said customer stations the one of said plans to be used for calls from that customer station, said plans including a first plan defining processing of received numbers such that a query of said database means is defined when a prespecified access code is received and such that call blocking is defined when one of a predefined plurality of destination numbers is received without said prespecified access code, said plurality of plans further including a second plan defining processing of received numbers such that continued call processing is defined when one of said predefined destination numbers is received,
receiving information for an outgoing call from one of said customer stations,
reading said stored data in said memory means to determine the one of said plans to be used for calls from said one station,
processing said received information in accordance with the determined dialing plan, and
switching said call to said feature node.

12. A call processing method for use in an arrangement comprising database means, a switching system connectable to a plurality of customer stations and a feature node for processing calls to and from said customer stations in cooperation with said switching system, said feature node including memory means, said method comprising
storing data in said memory means defining a plurality of dialing plans and defining for each of said customer stations the one of said plans to be used for calls from that customer station, said plans including a first plan defining processing of received numbers such that a query of said database means is defined when a prespecified access code is received and such that call blocking is defined when one of a predefined plurality of destination numbers is received without said prespecified access code, said plurality of plans further including a second plan defining processing of received numbers such that continued call processing is defined when one of said predefined destination numbers is received,
receiving information for an outgoing call from one of said customer stations,
reading said stored data in said memory means to determine the one of said plans to be used for calls from said one station,
processing said received information in accordance with the determined dialing plan,
determining whether said received information includes said prespecified access code, and
in response to determining that said received information does include said prespecified access code, switching said call to said feature node.

13. A method for use in an arrangement comprising database means and switching means, said switching means connectable to a plurality of customer stations, said switching means including memory means, said method comprising
storing data in said memory means defining a plurality of dialing plans and defining for each of said customer stations the one of said plans to be used for calls from that customer station, said plans including a first plan defining processing of received numbers such that a query of said database means is defined when a prespecified access code is received and such that call blocking is defined when one of a predefined plurality of destination numbers is received without said prespecified access code, said plurality of plans further including a second plan defining precessing of received numbers such that continued call processing is defined when one of said predefined destination numbers is received,
one of said customer stations transmitting to said switching means information for an outgoing call,
in response to receipt of said information from said one customer station, said switching means reading said stored data in said memory means to determine the one of said plans to be used for calls from said one station,
when the determined dialing plan is said first dialing plan, said switching means querying said database means to determine further processing of said call when said information from said one customer station does include said prespecified access code, and blocking said call when said information from said one customer station includes one of said predefined destination numbers without said prespecified access code,
in response to said query, said database means providing a query response to said switching means, and
said switching means processing said call in accordance with said query response.

14. A method for use in an arrangement comprising database means and switching means, said switching means connectable to a plurality of customer stations, said switching means including memory means, said method comprising storing data in said memory means defining a plurality of dialing plans and defining for each of said customer stations the one of said plans to be used for calls from that customer station, said plans including a first plan defining processing of received numbers such that a query of said database means is defined when a prespecified access code is received and such that call blocking is defined when one of a predefined plurality of destination numbers is received without said prespecified access code, said plurality of plans further including a second plan defining processing of received numbers such that continued call processing is defined when one of said predefined destination numbers is received, one of said customer stations transmitting to said switching means information for an outgoing call in response to receipt of said information from said one customer station, said switching means reading said stored data in said memory means to determine the one of said plans to be used for calls from said one station, when the determined dialing plan is said first dialing plan, said switching means querying said database means to determine further processing of said call when said information from said one customer station includes said prespecified access code, and one of said predefined destination numbers, in response to said query, said database means providing a query response to said switching means, wherein said query response defines caller verification, said switching means prompting said one station for a personal identification number, in response to said prompting, said one station transmitting a personal identification number to said switching means, said switching means communicating to said database means the personal identification number received from said one station, said database means determining entitlement to call completion based on the personal identification number received from said switching means, based on said determined entitlement, said database means transmitting a further response to said switching means, said further response defining call completion, and in response to said further response defining call completion, said switching means processing said further included destination number in accordance with said second dialing plan, and blocking said call when said information from said one customer station includes one of said predefined destination numbers without said prespecified access code.

* * * * *